United States Patent Office 2,810,847
Patented Oct. 22, 1957

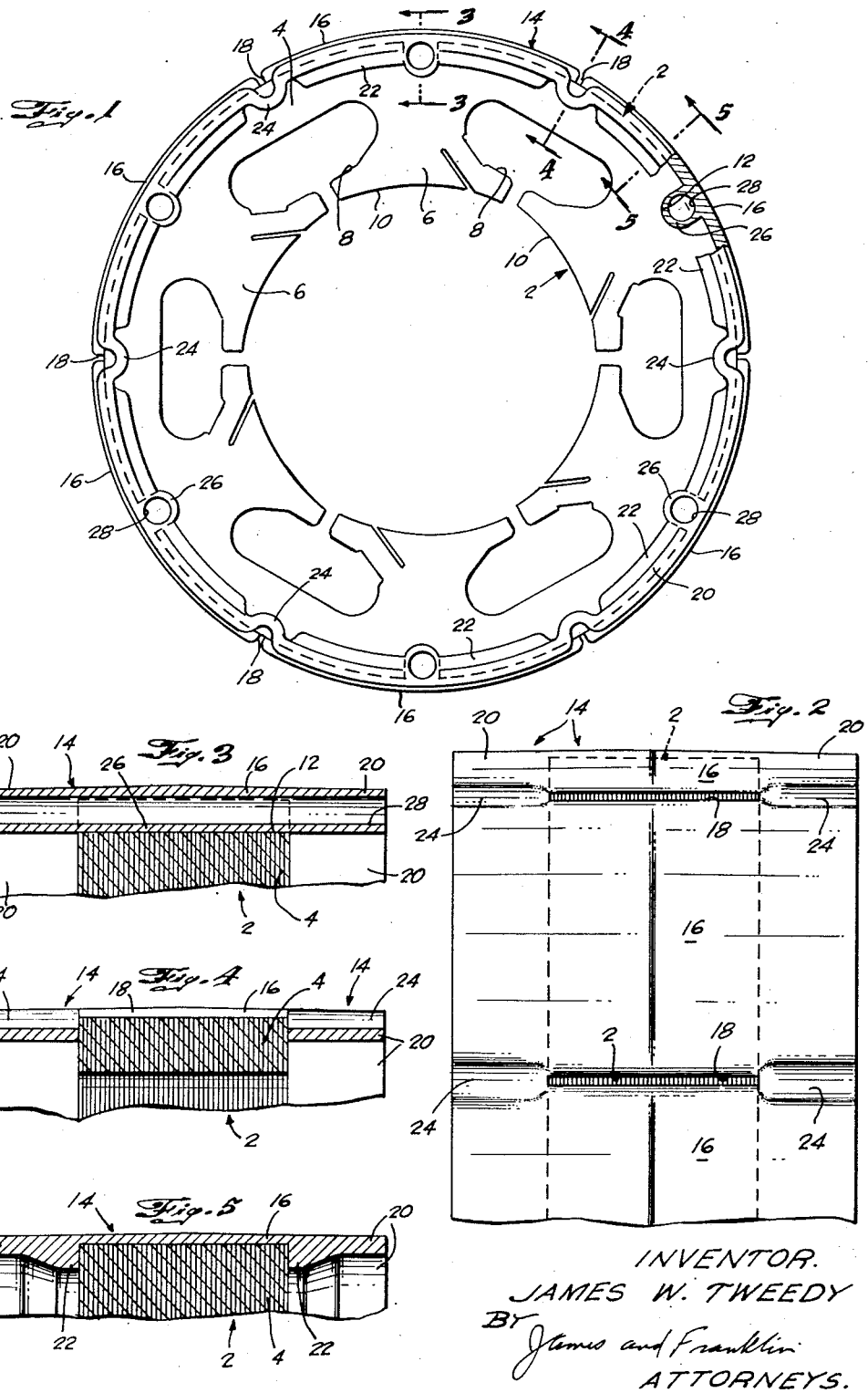
Oct. 22, 1957 — J. W. TWEEDY — 2,810,847
ELECTRIC MOTOR FIELD CONSTRUCTION
Filed June 8, 1956
INVENTOR.
JAMES W. TWEEDY
BY James and Franklin
ATTORNEYS.

2,810,847

ELECTRIC MOTOR FIELD CONSTRUCTION

James W. Tweedy, Owosso, Mich., assignor to Redmond Company, Inc., Owosso, Mich., a corporation of Michigan Application June 8, 1956, Serial No. 590,233

5 Claims. (Cl. 310—254)

The present invention relates to an electric motor field construction or the like in which special means, and preferably cast means, are employed to retain the field laminations in place.

It is conventional, for well known electrical reasons, to form the field structures of various types of electrical equipment, and particularly the rotors and stators of electric motors, from a plurality of similarly shaped laminations stacked one upon the other to desired axial depth. Means must be provided, of course, to retain the laminations in desired position and to restrain them against movement laterally, axially or rotationally. One way of accomplishing this which has been proposed in the past is to cast, mold or otherwise form a suitable supporting structure directly on the laminations while the latter are held in their proper position. For purposes of simplicity in this specification, the term "cast" will be used generically to cover all such forming methods, such as mold casting, die casting, injection molding, and the like. The cast material is usually applied and shaped while hot, and is then permitted to cool and solidify. The cooling of the cast material which engages and holds the laminations in place is almost invariably accompanied by shrinkage thereof, and this shrinkage causes the material to closely grasp the lamination. While this is essentially a desirable attribute, nevertheless it has proved difficult on a production basis to control the shrinkage within desired limits. When excessive shrinkage takes place excessive stresses are applied to the laminations which often result in distortion of the laminated core, and distortion of the lamination-holding material, or both.

In the formation of electric motor stators the material used to grasp and hold the laminations generally extends across the circumferential side surface of the lamination stack in order to protect the exposed edges of the laminations and to provide an integral casing therefor. When this is done the problems arising from the shrinking of the cast material are greatly accentuated.

The present invention provides for the securing of the laminations in desired position by means of material cast therearound in such a manner as to effectively avoid the problems involved in the shrinkage of the cast material when the latter cools while at the same time providing for firm and reliable retention of the laminations in place and providing a layer of cast material over substantially all of the exposed edges of the laminations.

To this end the lamination-securing element is formed in one piece, with portions extending over the circumferential side surfaces of the laminations and with portions extending out beyond the end surfaces of the stack of laminations and overlapping and engaging the stack end surfaces to retain the laminations in place. The portions which extend over the circumferential side surface of the laminations are segmented, the segments being spaced from one another by preferably narrow gaps extending generally from one stack end to the other. The portions which extend beyond the stack ends are secured to, and preferably are integrally formed with, each pair of adjacent segments, bridging the gaps between the segments at points beyond the ends of the lamination stack. Because of the spaced segmental nature of those portions which extend over the circumferential side surface of the laminations, the cooling and resultant shrinkage of those portions will neither give rise to excessive stresses in that material nor to undesirable compression of the laminations. The gaps between the segments thus act in an analogous manner to the gaps between the separated concrete blocks used for the paving of roadways.

The portions of the lamination-securing element which extend beyond the ends of the lamination stack are ring-like in nature. Since they do not radially engage any laminations, contractive forces developed in the cooling thereof have no appreciable effect on the overall structure. Nevertheless, it is usually desirable to provide those ring-like structures with integrally formed expansion joints, preferably in line with the ends of the gaps between the segments on the circumferential side surface of the lamination stack. These readily expansible and contractable areas may be defined by portions disconnected from the segments and extending radially out of the plane of the rings.

As a result the cast structure employed to hold the laminations in place is self-compensating upon cooling and effectively eliminates any distortion of the laminations, yet the lamination-securing structure is unitary and hence exceedingly effective. It has also been found that the structure under discussion is very readily cast, and particularly die cast, and may be more easily ejected from the die than structures previously employed for the same purpose.

To the accomplishment of the above, and to such other objects as may hereinafter appear, the present invention relates to the structure for an electric motor field structure or the like as defined in the appended claims and as described in this specification, taken together with the accompanying drawings, in which:

Fig. 1 is an end elevational view, partially broken away, of a stator constructed according to the present invention;

Fig. 2 is a partial top plan view thereof;

Fig. 3 is a cross sectional view taken along the line 3—3 of Fig. 1;

Fig. 4 is a cross sectional view taken along the line 4—4 of Fig. 1; and

Fig. 5 is a cross sectional view taken along the line 5—5 of Fig. 1.

The stator comprises a plurality of substantially similar laminations generally designated 2 stacked one upon the other to desired axial depth. The precise configuration of the laminations 2 may be widely varied in accordance with the style or design of the electric motor with which they are to be used. As here disclosed for purposes of illustration they comprise an outer ring 4 from which pole pieces 6 project radially inwardly, the pole pieces being separated by slots 8 for the reception of windings and terminating radially in pole faces 10 each of which lie along concentric arcs. At their outer periphery the laminations are provided with spaced inwardly extending recesses 12.

The lamination securing element, generally designated 14, may be formed of any suitable material, such as aluminum or a moldable synthetic plastic cast or otherwise formed in situ on and around the laminations 2 after the latter have been stacked and appropriately arranged. Portions of the element 14, generally designated 16, extend over and cover the circumferential side surface of the stack of laminations 2 from one end of the stack to the other except for the gaps 18 between the portions 16, those gaps extending from one end of the stack to the other. Hence the portions 16 define separated segments which, as may clearly be seen from Figs. 1 and 2, substantially completely cover the circumferential side surface of the stack of laminations except for the gaps 18, through which gaps the edges of the laminations 2 may be seen.

The lamination securing element 14 further comprises ring-like portions 20 which extend out axially beyond the ends of the lamination stack and which are circumferentially continuous. The axially inner ends of the portions 20, over substantially their entire length, are thickened as at 22 (see Figs. 1 and 5) so as to engage the outer end surfaces of the outer laminations of the stack and thus hold the laminations together. These thickened portions 22, as may be seen from Fig. 1, substantially correspond in location and circumferential length to the segments 16 but are somewhat circumferentially shorter than those segments 16. In line with the gaps 18 between the segments 16, the ring portions 20 are provided with parts 24 which are not directly connected to the segments 16 and which are bent inwardly toward the axis of the stator. These parts 24 preferably, although not necessarily, engage the outer end surfaces of the outer laminations of the stack.

The cast material defining the lamination securing element 14 also fills the recesses 12 at the outer periphery of the laminations 2, these parts of the element 14 being designated 26, in order to prevent rotational shifting of the laminations 2, and passages 28 are formed therethrough, preferably in the casting process, for the reception of through bolts adapted to secure end caps to the disclosed structure.

When the lamination securing element 14 is cast the material of which it is formed will be at a fairly high temperature. As that material cools it will tend to contract. The gaps 18 between the segments 16 permit this contraction to take place over the circumferential side surface of the lamination stack without the building up of excessive stresses in the cast material and without applying deformation-producing forces to the laminations 2. The ring-like portion 20 extending axially out from the stack of laminations can also contract as desired, the radially inwardly bent parts 24 acting as expansion joints permitting this contraction and readily changing their shape in accordance with the amount of contraction without causing any distortion of the overall shape of the ring-like portions 20. This is particularly important when it is considered that the portions 20 in effect define part of the outer casing of the motor, and that the through bolt passages 28 pass therethrough. Nevertheless, the parts 24 define bridges between the segments 16 and those parts of the ring-like portion 20 in line with those segments 16, thus producing a unitary lamination-securing element which can also function as a motor casing.

While but a single embodiment of the present invention has been here disclosed, it will be understood that many variations may be made all within the spirit of the invention as defined in the following claims.

I claim:

1. An electric field structure comprising a stack of laminations having opposite end surfaces and a circumferential side surface, and a lamination securing element of cast material comprising segments on said circumferential side surface of said laminations and spaced from one another over said side surface by gaps extending generally from one stack end to the other, and, secured to said segments, rings extending out beyond the end surfaces of said stack and having portions overlapping said stack end surfaces to retain the laminations in place, at least one of said rings being circumferentially continuous at least opposite one end of each of said gaps, whereby said segments and rings define a single element, said one of said rings being provided, at spaced intervals along its circumferential length, and in line with the ends of said gaps between said segments, with portions disconnected directly from said segments and extending radially out of the plane of said ring, thus permitting comparatively ready peripheral expansion of said ring where said portions are located during cooling of said cast material.

2. An electric field structure comprising a stack of laminations having opposite end surfaces and a circumferential side surface, and a lamination securing element of cast material comprising segments on said circumferential side surface of said laminations and spaced from one another over said side surface by gaps extending generally from one stack end to the other, and, secured to said segments, rings extending out beyond the end surfaces of said stack and having portions overlapping said stack end surfaces to retain the laminations in place, at least one of said rings being circumferentially continuous at least opposite one end of each of said gaps, whereby said segments and rings define a single element, said one of said rings being provided, at spaced intervals along its circumferential length, and in line with the ends of said gaps between said segments, with portions disconnected directly from said segments and extending radially inwardly out of the plane of said ring, thus permitting comparatively ready peripheral expansion of said ring where said portions are located during cooling of said cast material.

3. An electric field structure comprising a stack of laminations having opposite end surfaces and a circumferential side surface, and a lamination securing element of cast material comprising segments on said circumferential side surface of said laminations and spaced from one another over said side surface by gaps extending generally from one stack end to the other, and, secured to said segments, rings extending out beyond the end surfaces of said stack and having portions overlapping said stack end surfaces to retain the laminations in place, said rings being circumferentially continuous at least opposite the ends of said gaps, whereby said segments and rings define a single element, said rings being provided, at spaced intervals along their circumferential length, and in line with the ends of said gaps between said segments, with portions disconnected directly from said segments and extending radially out of the plane of said ring, thus permitting comparatively ready peripheral expansion of said ring where said portions are located during cooling of said cast material.

4. An electric field structure comprising a stack of laminations having opposite end surfaces and a circumferential side surface, and a lamination securing element of cast material comprising segments on said circumferential side surface of said laminations and spaced from one another over said side surface by gaps extending generally from one stack end to the other, and, secured to said segments, rings extending out beyond the end surfaces of said stack and having portions overlapping said stack end surfaces to retain the laminations in place, said rings being circumferentially continuous at least opposite the ends of said gaps, whereby said segments and rings define a single element, said rings being provided, at spaced intervals along their circumferential length, and in line with the ends of said gaps between said segments, with portions disconnected directly from said segments and extending radially inwardly out of the plane of said ring, thus permitting comparatively ready peripheral expansion of said ring where said portions are located during cooling of said cast material.

5. An electric field structure comprising a stack of laminations having opposite end surfaces and a circumferential side surface, and a lamination securing element of cast material comprising segments on said circumferential side surface of said laminations and spaced from one another over said side surface by gaps extending generally from one stack end to the other, and, secured to said segments, rings extending out beyond the end surfaces of said stack and having portions overlapping said stack end surfaces to retain the laminations in place, said rings being circumferentially continuous at least opposite the ends of said gaps, whereby said segments and rings define a single element, said rings being provided, at spaced intervals along their circumferential length, and in line with the ends of said gaps between said segments, with portions disconnected directly from said segments, extending radially inwardly out of the plane of said ring, and engaging said stack end surfaces, thus permitting comparatively ready peripheral expansion of said ring where said portions are located during cooling of said cast material.

References Cited in the file of this patent

UNITED STATES PATENTS

| | | |
|---|---|---|
| 876,930 | Bergman | Jan. 21, 1908 |
| 1,030,041 | Williamson | June 18, 1912 |
| 1,208,460 | Bisbee et al. | Dec. 12, 1916 |
| 2,769,933 | Ballman | Nov. 6, 1956 |